July 17, 1962 — P. G. BRADLEY — 3,044,205

BIRD-RETRIEVING GRAPPLE

Filed May 24, 1961

INVENTOR
Percy G. Bradley

BY
ATTORNEY

United States Patent Office 3,044,205
Patented July 17, 1962

3,044,205
BIRD-RETRIEVING GRAPPLE
Percy G. Bradley, 308 Glen Road, Toronto,
Ontario, Canada
Filed May 24, 1961, Ser. No. 112,428
2 Claims. (Cl. 43—1)

This invention relates to an improved bird-retrieving grapple especially adapted for use by hunters to recover birds floating offshore.

Generally a hunter after shooting waterfowl, must use a boat or dog to retrieve the bird from the water. The problem of retrieving birds felled on the water has always been great.

A primary object of this invention is to provide a novel bird-retrieving grapple which eliminates the necessity of using dogs or boats for the purpose of retrieving birds felled offshore.

Another object of the invention is to provide a novel bird-retrieving grapple which is easily used, stored and manufactured and which is highly practical and satisfactory for the purpose intended.

Other objects and the nature and advantages of the instant invention will become apparent from the following description taken in conjunction with the accompanying drawings, wherein.

Figure 1:
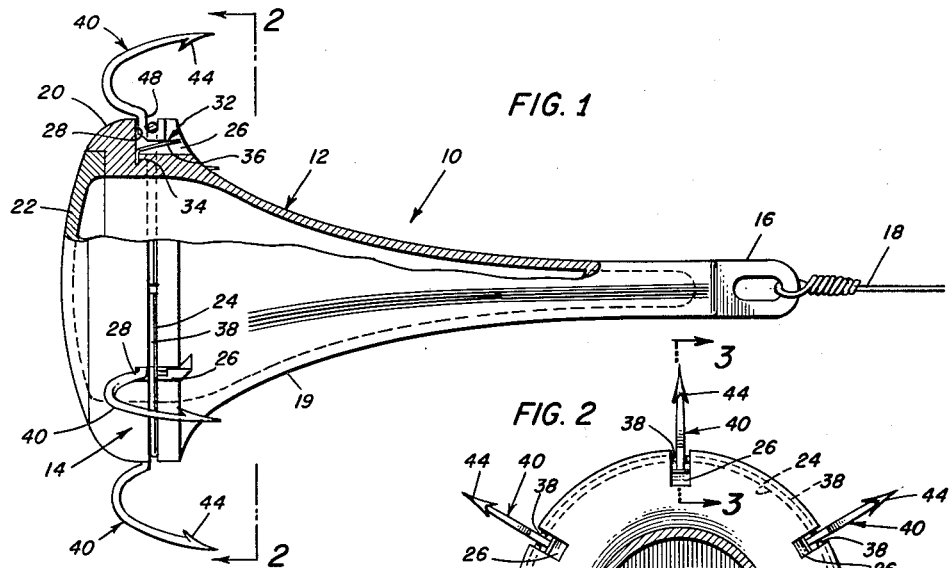
FIG. 1 is a side elevation of the novel bird-retrieving grapple with portions broken away to show structural details.

Referring to the drawing in detail, the novel bird-retrieving grapple is indicated generally at 10 and comprises a floatable body 12 upon which is mounted a hook assembly indicated generally at 14.

The preferred embodiment discloses the body as being hollow; however, a solid wooden block could be substituted. The body 12 will be constructed so that it will float on its side in the manner shown in FIG. 1.

The body 12 has an elongated "pear shape" and includes at one end an eye portion 16 to which a line 18 is secured. The line 18 may be mounted on a suitable reel (not shown) or may be cast in the manner of a "throw-line."

The hollow body 12 diverges intermediately from the eye portion 16 as indicated at 19 and terminates in an annular hook-mounting portion 20. The end of the body 12 is sealed by a suitable cap element 22 in any suitable manner.

Formed in the outer surface of hook-mounting portion 20 is an annular groove 24 which extends through a plurality of circumferentially spaced, rearwardly opening radial notches 26 which include a rear, radial abutment wall 28. Formed in the notches 26 are slots 30 which provide seats for substantially L-shaped leaf springs 32 having a short leg 34 seated in the slots 30 and a longer leg 36 projecting upwardly and rearwardly into the notches 26.

Removably secured in the groove 24 and extending transversely of each of the notches 26 is a snap ring 38 removably mounting radially disposed hooks 40 of the hook assembly 14 on the body 12. The ring 38 will permit ready replacement of the hooks 40 in the event they are damaged.

The hooks 40 include a C-shaped body portion 42 terminating in a barb portion 44 at one end. The body portion 42 includes at the other end a U-shaped mounting portion 46 including a notch 48 through which the ring 38 extends, and has angularly related abutment faces 50, 52 and 54.

Figure 2:
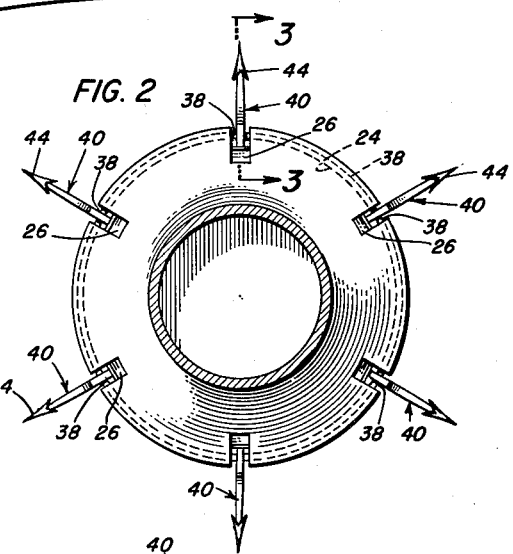
FIG. 2 is a section taken substantially on plane of line 2—2 of FIG. 1.
Figure 3:
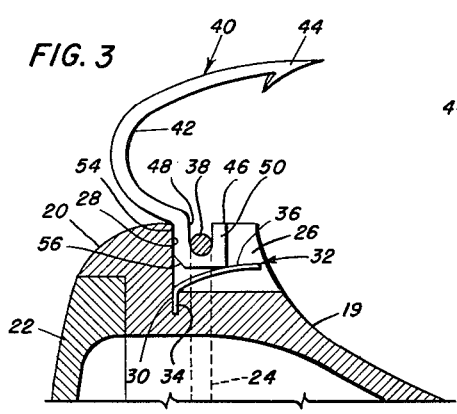
FIG. 3 is an enlarged fragmentary section taken substantially on the plane of line 3—3 of FIG. 2, showing one of the hooks disposed in an operative position.
Figure 5:
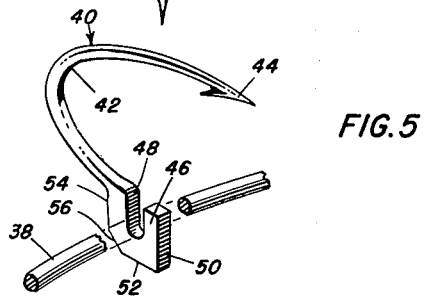
FIG. 5 is a fragmentary perspective view of one of the hooks and a fragmentary portion of the mounting ring for the hooks.

The bird-retrieving grapple, when used for the purpose intended, will have the hooks 40 disposed in the position shown in FIGS. 1–3. The leg 36 of spring 32 will engage the face 52 of portion 46 and the face 54 will engage wall 28 of notch 26 and in this manner counterclockwise rotation of the hooks beyond the position shown in FIG. 3 is prevented.

Figure 4:
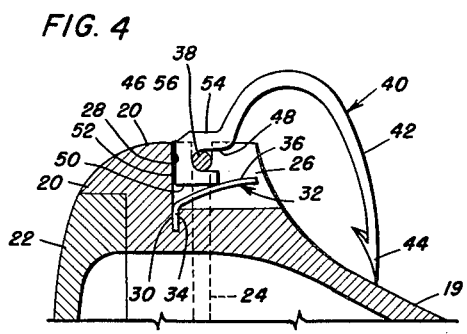
FIG. 4 is a view similar to FIG. 3, showing the stored position of the hooks.

When it is desired to store the grapple, the hooks 40 can be rotated 180 degrees to the position shown in FIG. 4 and the barbs 44 will engage body portion 18. It will be noted that the spring leg 36 normally retains the hooks in the operative position of FIG. 3. The mounting portion 46 is provided with a relieved corner 56 between faces 52 and 54 to facilitate rotation of the hooks between the operative and stored positions.

In use, after a bird is felled, the hooks 40 are disposed in the position shown in FIGS. 1–3, the grapple 10 is cast from the shore beyond the bird to be retrieved, and floats on the surface of the water. The grapple is then drawn in by the line 18 and the bird is retrieved.

It will be obvious to those skilled in the art that various changes may be made without departing from the spirit of the invention and therefore the specification and drawings are referred to by way of explanation and not definition or restriction, the scope of the invention being set forth by the appended claims.

What is claimed as new is as follows:

1. A bird retrieving grapple comprising an elongated floatable body, said body including connecting means at one end for connection to a casting line, said body portion including an annular mounting portion at the other end, said body portion diverging from said connecting portion toward said mounting portion, said mounting portion including a continuous, radially-opening, annular groove portion, a plurality of circumferentially spaced, notch portions opening radially through said annular groove portion and toward said connecting means, each of said notch portions including a pair of intersecting abutment walls spaced from said groove portion, one of said abutment walls being disposed substantially normal to the longitudinal axis of the body member and the other abutment wall being substantially parallel to said longitudinal axis, a lock ring removably received in said annular groove and including intermediate portions extending transversely of said notch portions, a grapple hook mounted on each of said intermediate lock ring portions, said hooks having a C-shaped portion terminating in a terminal barb at one end, said C-shaped portion terminating at its other end in a U-shaped mounting portion opening toward said terminal barb, said U-shaped mounting portion including a plurality of angularly related abutment surfaces, and a leaf spring anchored in said notches and engageable with at least two of the angularly related abutment surfaces of said U-shaped mounting portions, one abutment surface of said U-shaped portion of said hooks orienting said hooks into an operative position outwardly from said notches with the terminal barb radially spaced from and extending toward said connecting means, and another of said abutment surfaces on said U-shaped mounting portion orienting said terminal barb into a stored position in substantial engagement adjacent the diverging portion of said floatable body and directed toward the longitudinal axis thereof.

2. The structure of claim 1 wherein said floatable body is "pear-shaped" and comprises a hollow, plastic member.

References Cited in the file of this patent

UNITED STATES PATENTS

| | | |
|---|---|---|
| 637,169 | Slotterbeck | Nov. 14, 1899 |
| 1,810,565 | Kenely | June 16, 1931 |
| 2,522,692 | Speer | Sept. 19, 1950 |